United States Patent [19]
Sato et al.

[11] Patent Number: 5,111,716
[45] Date of Patent: May 12, 1992

[54] AUTOMATIC TRANSMISSION FOR HYDRAULIC DRIVE AUXILIARY SPEED CHANGE GEAR

[75] Inventors: Masayuki Sato, Komatsu; Haruyuki Matsuda, Kawasaki, both of Japan

[73] Assignee: Kabushiki Kaisha Komatsu Seisakusho, Tokyo, Japan

[21] Appl. No.: 721,451

[22] PCT Filed: Dec. 21, 1989

[86] PCT No.: PCT/JP89/01284
§ 371 Date: Jul. 1, 1991
§ 102(e) Date: Jul. 1, 1991

[87] PCT Pub. No.: WO90/07661
PCT Pub. Date: Jul. 12, 1990

[30] Foreign Application Priority Data
Dec. 29, 1988 [JP] Japan .................... 63-331273

[51] Int. Cl.⁵ .............................. F16H 47/02
[52] U.S. Cl. .................. 74/733.1; 74/731.1; 192/103 F
[58] Field of Search ............... 74/730.1, 731.1, 732.1, 74/733.1; 192/103 F, 87.18, 87.14

[56] References Cited

U.S. PATENT DOCUMENTS

| | | | |
|---|---|---|---|
| 3,529,705 | 9/1970 | Cudnohufsky | 192/87.18 |
| 4,368,798 | 1/1983 | Meyerle et al. | 192/87.14 X |
| 4,480,502 | 11/1984 | Nembach | 74/733.1 X |
| 4,528,871 | 7/1985 | Nembach | 74/733.1 |
| 4,899,542 | 2/1990 | Iino | 74/733.1 |
| 4,947,687 | 8/1990 | Martini et al. | 74/733.1 |

*Primary Examiner*—Leslie A. Braun
*Assistant Examiner*—Matthew Stavish
*Attorney, Agent, or Firm*—Richards, Medlock & Andrews

[57] ABSTRACT

An automatic transmission for a hydraulic excavator or the like has an auxiliary speed change gear, capable of changing between high and low speeds, and an automatic change-over valve in a hydraulic circuit which connects the high and low speed clutches and a clutch operating hydraulic pump. One end of the automatic change-over valve is connected to the discharge side of the pump by a conduit containing an automatic speed changing valve. A rotation sensing hydraulic source is coupled to a shaft of the auxiliary speed change gear. A hydraulic circuit connects the discharge side of the rotation sensing hydraulic source to one end of the automatic speed changing valve. The automatic speed changing valve changes over the clutches automatically, without damaging the hydraulic motor driving the clutches.

18 Claims, 5 Drawing Sheets

1

AUTOMATIC TRANSMISSION FOR HYDRAULIC DRIVE AUXILIARY SPEED CHANGE GEAR

BACKGROUND OF THE INVENTION

1. Field of the Invention

The present invention relates to a transmission for a hydraulically driven vehicle, and more particularly, to an automatic transmission for a hydraulic excavator or the like which has an auxiliary speed change gear capable of shifting between high and low speed ranges.

2. Description of the Related Art

In a conventional hydraulic excavator or the like which has an upper swivel body and a lower travel body and which runs with an hydraulically driven motor provided with an auxiliary speed change gear capable of changing between high and low speed ranges, the auxiliary speed change gear is of constant-mesh type and is manually operated by means of an operation lever to change speeds between high and low speeds. Speed change operation therefore requires that the vehicle be stopped temporarily, and is thus troublesome: it is difficult to conduct speed change operation quickly and smoothly.

An auxiliary speed change gear which employs a wet multiple disk clutch hydraulically operated to change between high and low speed ranges by means of an operation valve has also been proposed in, for example, Japanese Utility Model Laid-Open No. 172817/1986. With this auxiliary speed change gear, an operation of shifting a speed changing gear from low to high speed, which is conducted while the vehicle is running at a high speed, may cause overrun of the hydraulically driven motor and damage the hydraulic motor or a low speed clutch.

SUMMARY OF THE INVENTION

In view of the aforementioned drawbacks of the prior techniques, an object of the present invention is to provide an automatic transmission for a hydraulically driven auxiliary speed change gear which assures easy speed changing gear shifting operation during travel and which eliminates damage to an hydraulically driven motor or the like.

To this end, the present invention provides an automatic transmission for a hydraulically driven auxiliary speed change gear which is a power transmitting speed change gear including a hydraulically driven motor and an auxiliary speed change gear provided with hydraulically operated clutches to shift between high and low speed ranges. In this automatic transmission, an automatic change-over valve is provided in a hydraulic circuit which connects cylinders of the high and low speed clutches to a clutch operating hydraulic pump. One end of the automatic change-over valve is connected to the hydraulic circuit connected to the discharge side of the pump by a conduit pipe, and an automatic speed changing valve is provided in the conduit pipe. A rotation sensing hydraulic pump coupled to an input shaft of the auxiliary speed change gear is connected to one end of the automatic speed changing valve and to the other end of the automatic speed changing valve through an orifice. The other end of the automatic speed changing valve is connected to a hydraulic circuit which is located between the low-speed clutch and the automatic change-over valve by a conduit pipe. The rotation sensing hydraulic pump may be connected not to the input shaft of the auxiliary speed change gear but to an output shaft thereof. Alternatively, the input shaft of the auxiliary speed change gear may be connected to an annular centrifugal hydraulic pressure detecting chamber which is employed in place of the rotation sensing hydraulic pump and the orifice. In that case, a pressure detecting pipe inserted in this chamber is connected to one end of the automatic speed change valve.

In a case where the combination of the orifice and the rotation sensing hydraulic pump coupled to an input or output shaft of the auxiliary speed change gear is employed, the automatic speed changing valve is controlled by utilizing a difference in the discharge pressure of the rotation sensing hydraulic pump which varies in accordance with the rotation speed of the hydraulically driven motor and the discharge pressure which has passed through the orifice, to change over the automatic change-over valve due to the pilot pressure from the automatic speed changing valve and thereby change-over the clutches automatically without damaging the hydraulically driven motor or the like. In the case of the annular centrifugal hydraulic pressure detecting chamber coupled to the input shaft of the auxiliary speed change gear also, the automatic speed changing valve is controlled by utilizing the centrifugal hydraulic pressure which varies in accordance with a change in the rotational speed of the hydraulically driven motor to change over the automatic change-over valve due to the pilot pressure from the automatic speed changing valve, as in the above-described case. In consequence, this configuration is as advantageous as the case of the combination of the rotation sensing hydraulic pump and the orifice.

DESCRIPTION OF THE PREFERRED EMBODIMENTS

Figure 1:
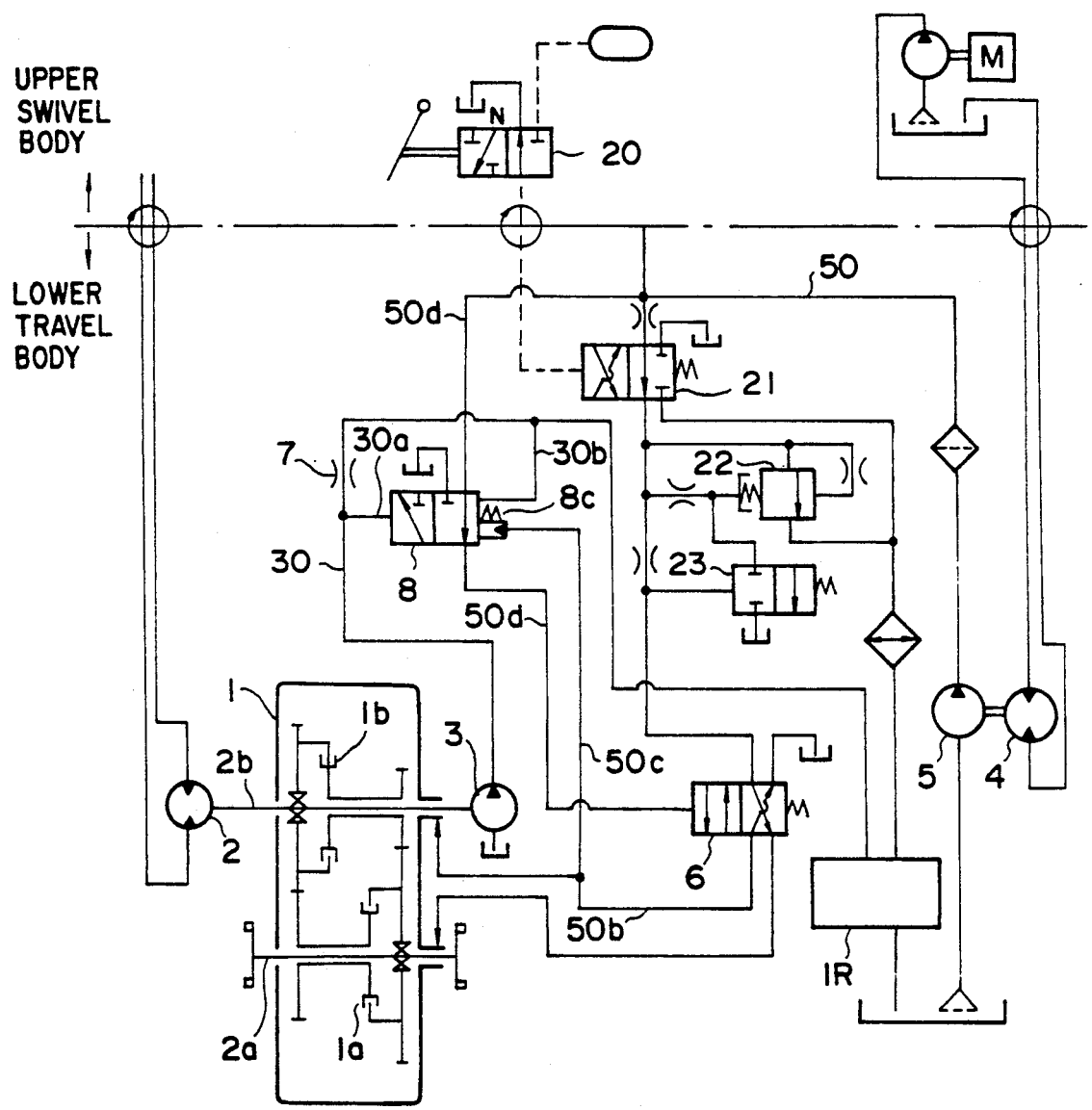
FIG. 1 is an hydraulic circuit of a first embodiment of the present invention.

FIG. 1 is a hydraulic circuit diagram of a first embodiment of the present invention. A gear type auxiliary speed change gear 1, which is capable of shifting between high and low speed ranges, has an hydraulically operated high-speed clutch 1a and a hydraulically operated low-speed clutch 1b. One end of an input shaft 2b of the auxiliary speed change gear 1 is connected to an hydraulically driven motor 2 provided in an hydraulic circuit which extends from a main pump driven by an engine M mounted on an upper swivel body to a lower travel body via a swivel joint, and the other end of the input shaft 2b driven by the motor 2 is coupled to a rotation sensing hydraulic pump 3. In a hydraulic circuit 30 which extends from the rotation sensing hydraulic pump 3 to a lubricating portion 1R of the auxiliary speed change gear 1 is provided an orifice 7. In the hydraulic circuit which extends from the upper swivel body to the lower travel body via the swivel joint in the manner stated above is also provided a clutch operating hydraulic pump driving motor 4, and in a hydraulic circuit 50 which extends from a clutch operating hydraulic pump 5 driven by the driving motor 4 to the cylinders of the high-speed and low-speed clutches 1a and 1b is provided an automatic change-over valve 6. In a conduit pipe 50d which diverges from the hydraulic circuit 50 at a point located in advance of the automatic change-over valve 6 and which reaches one end of the automatic change-over valve 6 is provided an automatic speed changing valve 8. Left end of the automatic speed changing valve 8 is connected to a conduit pipe 30a which diverges from the hydraulic circuit 30 at a point located in advance of the orifice 7, and the right end thereof is connected to a conduit pipe 30b which diverges from the hydraulic circuit 30 at a point located behind the orifice 7 and to a conduit pipe 50c which diverges from the hydraulic circuit 50 at a point located in advance of the low-speed clutch 1b.

Figure 2:
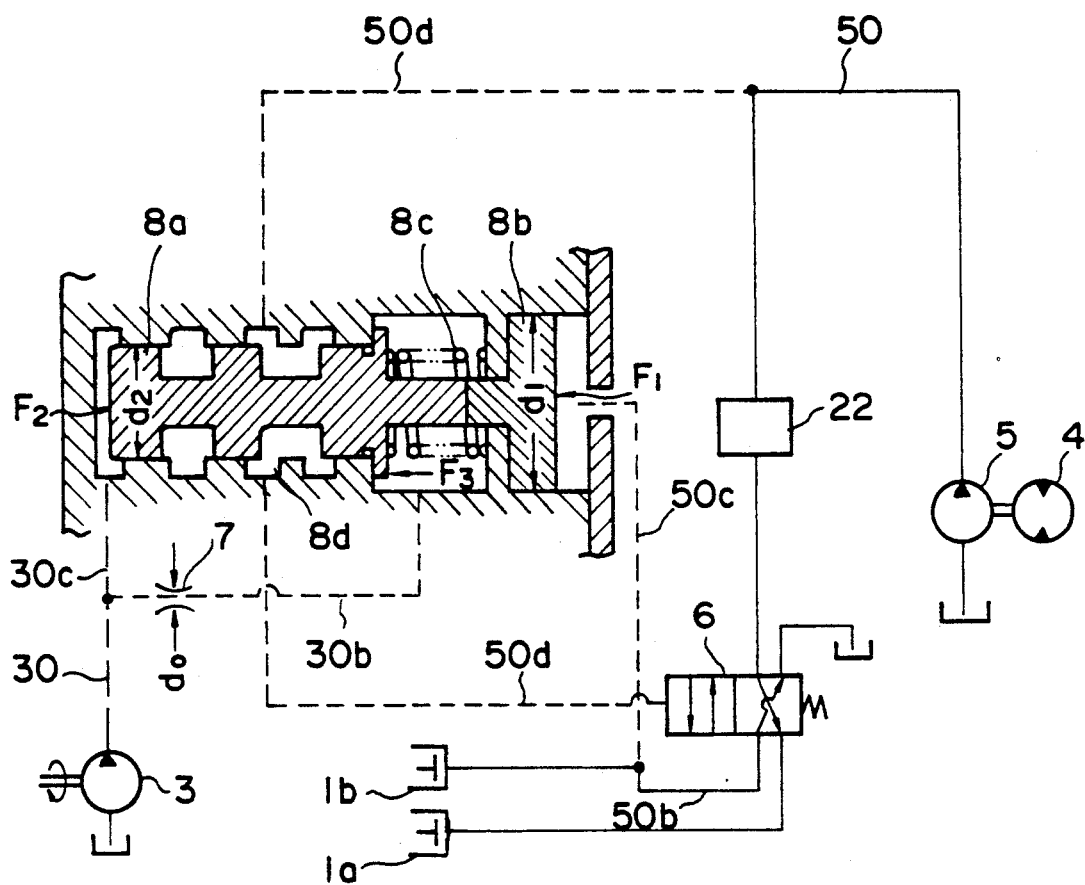
FIG. 2 is a cross-sectional view of an automatic speed changing valve according to the present invention.

As shown in detail in FIG. 2, in the automatic speed changing valve 8, a spool 8a and a piston 8b are inserted in a valve body, and a spring 8c is provided between the spool 8a and the piston 8b. The hydraulic circuit 30 which extends from the rotation sensing hydraulic pump 3 is connected to the left end of the spool 8a. The hydraulic circuit 30 diverges and is also connected to the right end (the portion of the valve where the spring 8c is inserted) of the spool 8a via the orifice 7. The conduit pipe 50b branches into a conduit pipe 50c at a point between the automatic change-over valve 6 and the low-speed clutch 1b, and the conduit pipe 50c is connected to the right end of the piston 8b. The hydraulic circuit 50 branches into the conduit pipe 50d at a point located in advance of the automatic change-over valve 6, and the conduit pipe 50d is connected to one end of the automatic change-over valve 6 via a pressurized oil port 8d of the automatic speed changing valve 8.

In the thus-arranged automatic transmission, when the main pump is driven by the engine M mounted on the upper swivel body, the hydraulically driven motor 2 provided in the hydraulic circuit extending from the main pump to the lower travel body via the swivel joint is driven. In a case where the vehicle runs in a low speed range which is achieved by the engagement of the low-speed clutch 1b of the auxiliary speed change gear 1, when the rotational speed of the hydraulically driven motor 2 is increased to 2700 rpm or above, the high-speed clutch 1a is engaged and the speed changing gear is shifted to the high-speed range. In a case where the vehicle travels in a high-speed range which is achieved by the engagement of the high-speed clutch 1a, when the rotational speed of the hydraulically driven motor 2 is reduced to 800 rpm or below, the low-speed clutch 1b is engaged and the speed change gear is shifted to the low-speed range. The inner diameter of the orifice 7 provided in the hydraulic circuit 30 which reaches from the rotation sensing hydraulic pump 3, the pressure receiving area of the spool 8a and that of the piston 8b of the automatic speed changing valve 8 connected to the hydraulic circuit 30, and the tension of the spring 8 are set beforehand to values which assure the above-described speed change gear shifting operations.

More concretely, the discharge v of the rotation sensing hydraulic pump 3 is 10 cc/rev, the diameter d0 of the orifice 7 is 2.7 mm, the diameter d2 of the spool 8a is 15 mm, the diameter d1 of the piston 8b is 28 mm, the tension F3 of the spring 8c is 7 kg, and the hydraulic pressure p for the high-speed and low-speed clutches is 20 kg/cm$^2$. When the rotational speed of the hydraulically driven motor 2 is increased to 2700 rpm or above while the vehicle is running in the low-speed range, force F2 which presses the spool 8a rightward becomes larger than the sum of force F1 which presses the piston 8b leftward and the tension F3 of the spring 8c due to the difference in the pressure in the portion in the hydraulic circuit 30 located in advance of the orifice 7 and in the portion located behind the orifice 7, moving the spool 8a rightward and thereby closing the port 8d. Since the port 8d is connected to the left end of the automatic change-over valve 6 via the conduit pipe 50d, closing of the port 8d moves the automatic change-over valve 6 leftward, thereby disengaging the low-speed clutch 1b and engaging the high-speed clutch 1a to attain the high-speed range. When the rotational speed of the hydraulically driven motor 2 is decreased to 800 rpm or below while the vehicle is running in the high-speed range, although the force F1 which presses the spool 8a leftward is zero, the force F2 which presses the spool 8a rightward becomes smaller than the tension F3 of the spring 8c, moving the spool 8a leftward and thereby opening the port 8d. As a result, the automatic change-over valve 6 moves rightward which is the opposite direction in which the valve 6 is moved in the above-described case, and the high-speed clutch 1a is disengaged and the low-speed clutch 1b is engaged to attain the low-speed range.

In FIG. 1, when a shift valve 20 provided in the upper swivel body is positioned at neutral N, a neutral valve 21 provided in the lower travel body is moved to the neutral position N due to the air pilot pressure, making the hydraulic circuit 50 neutral. A modulation valve 22 and a quick returning valve 23 have the function of lowering the degree at which the hydraulic pressure for the clutch is increased to shift the speed change gear and of reducing the impacts imparted when the speed range is changed over.

In this embodiment, since the speed change gear is shifted from the high-speed range to the low-speed range when the rotational speed of the hydraulically driven motor 2 is reduced to 800 rpm or below, the hydraulically driven motor 2 or the low-speed clutch 1b is not damaged. Furthermore, since the clutch operating hydraulic pump 5 is provided in the lower travel body and is driven by the dedicated driving motor 4, suction resistance is small and the possibility of the clutch operating hydraulic pump 5 being damaged is very small as compared with the case in which the clutch operating hydraulic pump is provided in the upper swivel body and is directly driven by the engine M.

Figure 3:
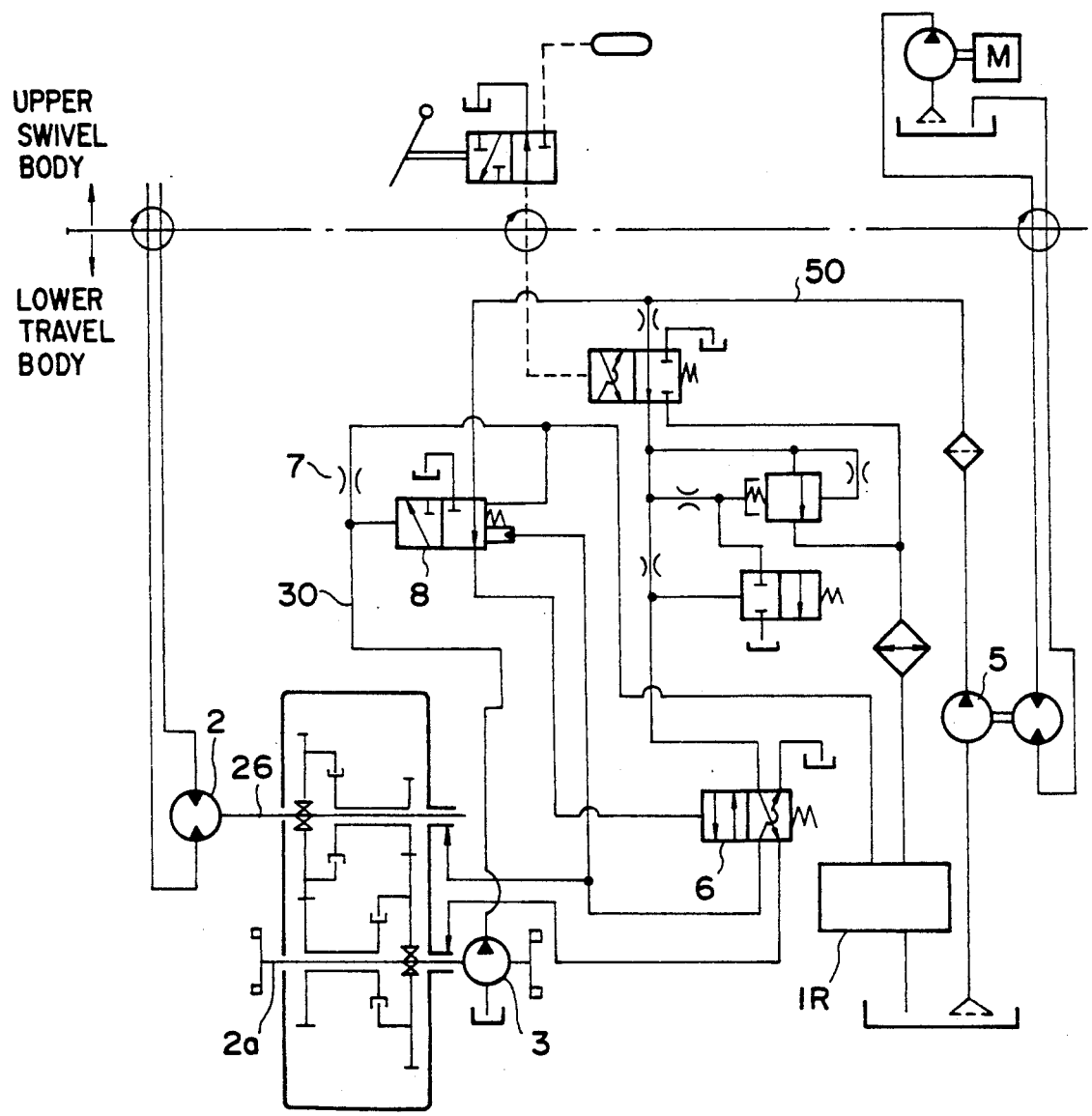
FIG. 3 is an hydraulic circuit of a second embodiment of the present invention.

FIG. 3 is an hydraulic circuit of a second embodiment of the present invention. In FIG. 3, the rotation sensing hydraulic pump 3 is coupled to an output shaft 2a of the auxiliary speed change gear 1. Other structures and advantages are the same as those of the first embodiment.

Figure 4:
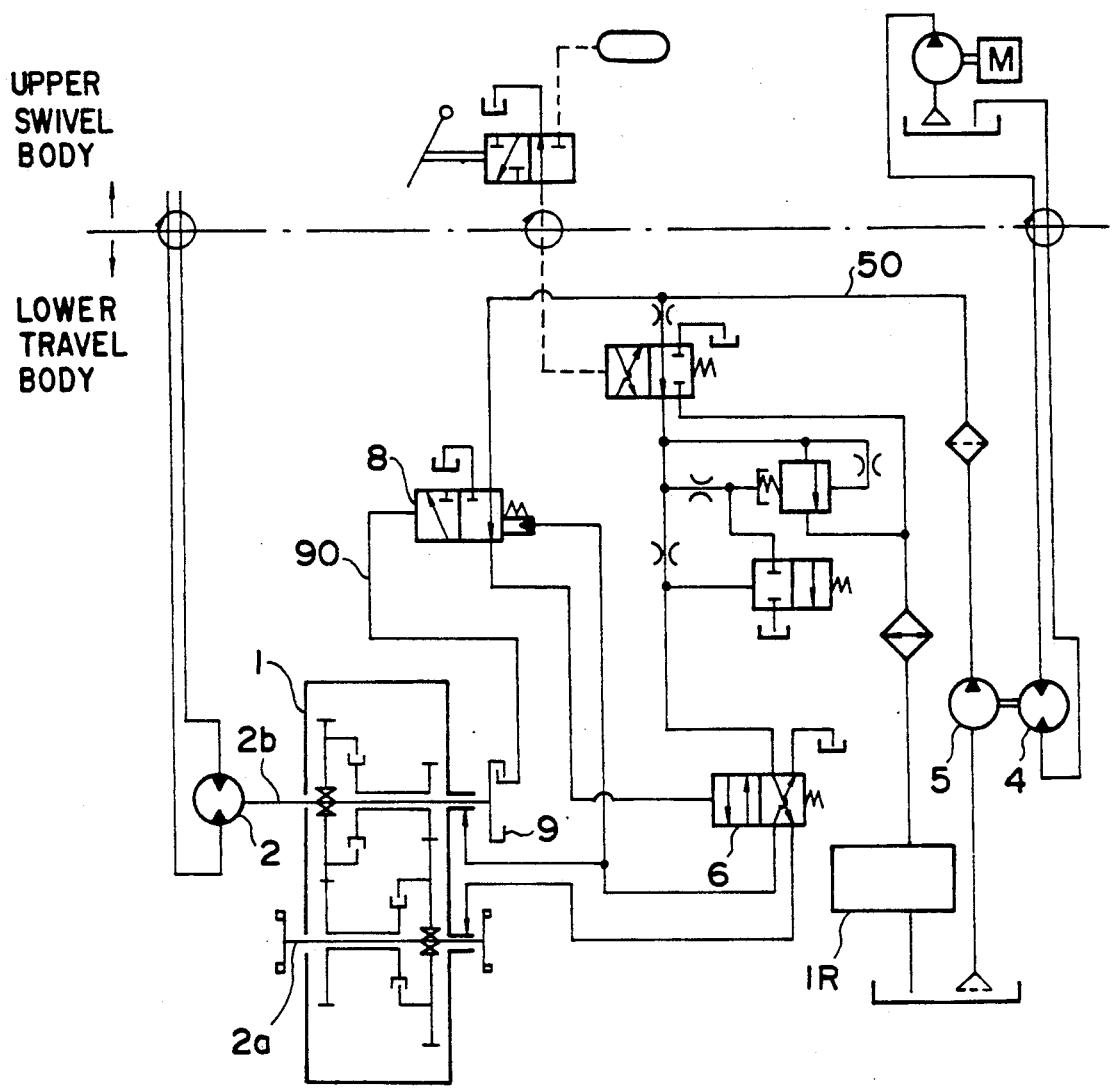
FIG. 4 is an hydraulic circuit of a third embodiment of the present invention.
Figure 5:
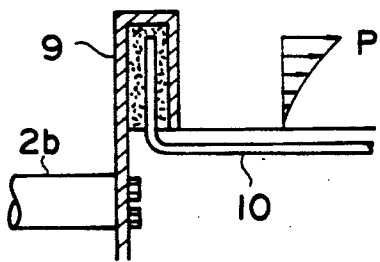
FIG. 5 shows a centrifugal hydraulic pressure detecting chamber according to the present invention.

FIG. 4 is an hydraulic circuit of a third embodiment of the present invention. In this embodiment, a centrifugal hydraulic pressure detecting chamber 9 is provided in place of the combination of the rotation sensing hydraulic pump 3 and the orifice 7 which are employed in the first embodiment. FIG. 5 shows this centrifugal hydraulic pressure detecting chamber 9. In the annular centrifugal hydraulic pressure detecting chamber 9 which is coupled to the input shaft 2b of the auxiliary speed change gear 1 is charged, an hydraulic oil of the same type which is charged in other circuits. A pressure detecting pipe 10 is inserted into the centrifugal hydraulic pressure detecting chamber 9. This pressure detecting pipe 10 is connected to one end of the automatic speed changing valve 8 via an hydraulic circuit 90 to transmit a centrifugal hydraulic pressure P in the centrifugal hydraulic pressure chamber 9, which varies in accordance with a change in the rotational speed of the input shaft 2b, to the automatic speed changing valve 8 as a shift pressure. Other structures and advantages are the same as those of the first embodiment.

Figure 6:
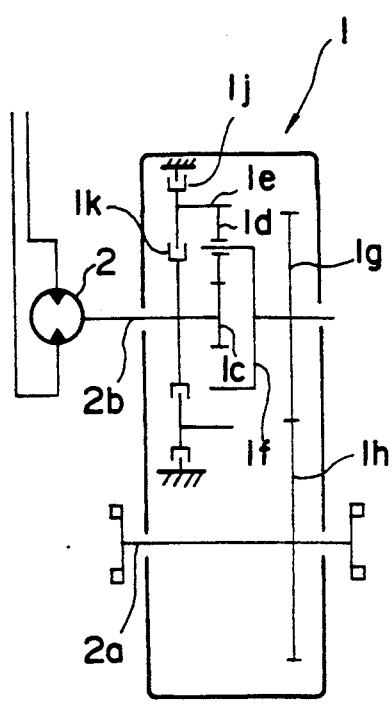
FIGS. 6 and 7 show the configurations of planetary gear type auxiliary speed change gears.
Figure 7:
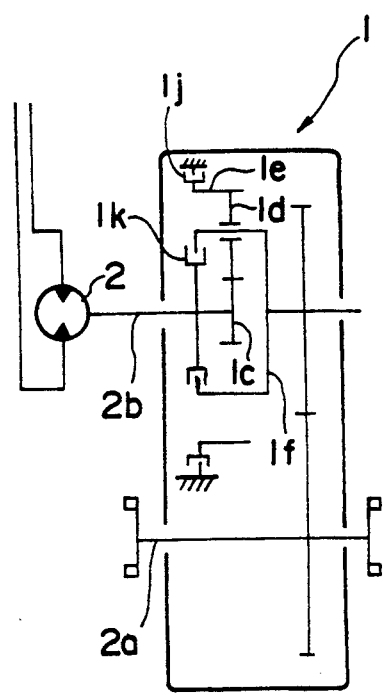

The gear mechanism of the auxiliary speed change gear may also comprise either of epicyclic gear mechanisms shown in FIGS. 6 and 7. In the auxiliary speed change gear shown in FIG. 6, power transmitted to a sun gear 1c from the hydraulically driven motor 2 through the input shaft 2b is transmitted to a plurality of planetary gears 1d provided on the outer periphery of the sun gear 1c. On the outer periphery of the planetary gears 1d is provided a ring gear 1e. In a case where the vehicle travels in the low-speed range, since the low-speed clutch 1j is engaged, the ring gear 1e is fixed and the planetary gears 1d rotate within the ring gear 1e and thereby transmit a reduced rotation to a planetary carrier 1f. The power of the planetary carrier 1f is transmitted to the output shaft 2a through a drive gear 1g fixed to the shaft of the planetary carrier 1f and a driven gear 1h engaged with the drive gear 1g. In a case where the vehicle runs in the high-speed range, the high-speed clutch 1k is engaged, and the sun gear 1c is thereby rotated together with the ring gear 1e. As a result, the rotation of the input shaft 2b is transmitted without being reduced to the planetary carrier 1f.

In the auxiliary speed change gear shown in FIG. 7, when the high-speed clutch 1k is engaged, the sun gear 1c and the planetary carrier 1f are rotated as one unit. As a result, the rotation of the input shaft 2b is transmitted to the planetary carrier 1f efficiently. In the case of the travelling in a low-speed range, the structure and the advantage are the same as those shown in FIG. 6.

INDUSTRIAL APPLICABILITY

As will be understood from the foregoing description, the automatic transmission according to the present invention is useful as an automatic transmission for a hydraulic excavator which has an auxiliary speed change gear capable of automatically change over speeds between the high and low speed ranges without damaging the hydraulically driven motor or the like.

What is claimed is:

1. An automatic transmission for a hydraulically driven auxiliary speed change gear which is a power transmitting/speed change gear including a hydraulically driven motor and an auxiliary speed change gear provided with hydraulically operated clutches engaged and disengaged to attain high and low speeds, said automatic transmission comprising:

an automatic change-over valve provided in a hydraulic circuit which connects said high and low speed clutches to a clutch operating hydraulic pump, a first conduit pipe which conducts one end of said automatic change-over valve to a hydraulic circuit connected to a discharge side of said clutch operating hydraulic pump, an automatic speed changing valve provided in said first conduit pipe, a rotation sensing hydraulic pump coupled to an input shaft of said auxiliary speed change gear, a second conduit pipe which connects a hydraulic circuit connected to a discharge side of said rotation sensing hydraulic pump to one end of said automatic speed changing valve, a third conduit pipe which connects the hydraulic circuit connected to the discharge side of said rotation sensing hydraulic pump to the other end of said automatic speed changing valve through an orifice, and a fourth conduit pipe which connects the other end of said automatic speed changing valve to a hydraulic circuit which is located between said low-speed clutch and said automatic change-over valve.

2. An automatic transmission comprising:

an auxiliary speed change gear which is a power transmitting/speed change gear, said auxiliary speed change gear having an input shaft and an output shaft, a hydraulically operated high speed clutch engagable between said input shaft and said output shaft to attain a high speed range, a hydraulically operated low speed clutch engagable between said input shaft and said output shaft to attain a low speed range, said auxiliary speed change gear being capable of shifting between said high and low speed ranges;

a hydraulically driven motor for driving said input shaft;

a clutch operating hydraulic pump having a discharge side, an automatic change-over valve, a first hydraulic circuit which connects said high speed clutch to said automatic change-over valve, a second hydraulic circuit which connects said low speed clutch to said automatic change-over valve, a third hydraulic circuit which connects said automatic change-over valve to the discharge side of said clutch operating hydraulic pump, said automatic change-over valve selectively connecting said third hydraulic circuit to one of said first and second hydraulic circuits;

a fourth hydraulic circuit which connects a pilot port of said automatic change-over valve to said discharge side of said clutch operating hydraulic pump, an automatic speed changing valve provided in said fourth hydraulic circuit between said discharge side of said clutch operating hydraulic pump and said pilot port of said automatic change-over valve, said automatic speed changing valve having first and second pilot ports such that the pressures therein are in opposition to each other;

a rotation sensing hydraulic source coupled to one of said input shaft and said output shaft, said rotation sensing hydraulic source having a discharge side;

a fifth hydraulic circuit which connects the discharge side of said rotation sensing hydraulic source to the first pilot port of said automatic speed changing valve; and a sixth hydraulic circuit which connects the second pilot port of said automatic speed changing valve to said second hydraulic circuit.

3. An automatic transmission in accordance with claim 2 wherein said automatic speed changing valve has a third pilot port wherein the pressure is in opposition to the pressure in said first pilot port; wherein said rotation sensing hydraulic source comprises a rotation sensing hydraulic pump; and wherein said automatic transmission further comprises an orifice, and a seventh hydraulic circuit which connects the discharge side of said rotation sensing hydraulic pump through said orifice to the third pilot port of said automatic speed changing valve.

4. An automatic transmission in accordance with claim 3 wherein said rotation sensing hydraulic pump is coupled to said input shaft.

5. An automatic transmission in accordance with claim 3 wherein said rotation sensing hydraulic pump is coupled to said output shaft.

6. An automatic transmission in accordance with claim 3 wherein said automatic speed changing valve comprises a valve body having first, second, third and fourth cavities therein, a spool positioned in said valve body and extending from its first end in said first cavity through said second cavity to its second end in said third cavity, a piston positioned in said fourth cavity and having a axial portion extending into said third cavity for selective engagement with the second end of said spool, and a spring positioned to bias said spool toward said first cavity, said fourth hydraulic circuit including said second cavity, said first pilot port being connected to said first cavity, said second pilot port being connected to said fourth cavity such that pressure in said sixth hydraulic circuit urges said piston towards said spool, and said third pilot port being connected to said third cavity.

7. An automatic transmission in accordance with claim 2 wherein said rotation sensing hydraulic source comprises an annular centrifugal hydraulic pressure detecting chamber having a pressure detecting pipe positioned therein.

8. An automatic transmission in accordance with claim 7 wherein said rotation sensing hydraulic source is coupled to said input shaft.

9. An automatic transmission in accordance with claim 7 wherein said rotation sensing hydraulic source is coupled to said output shaft.

10. An automatic transmission in accordance with claim 7 wherein said automatic speed changing valve comprises a valve body having first, second, third and fourth cavities therein, a spool positioned in said valve body and extending from its first end in said first cavity through said second cavity to its second end in said third cavity, a piston positioned in said fourth cavity and having a axial portion extending into said third cavity for selective engagement with the second end of said spool, and a spring positioned to bias said spool toward said first cavity, said fourth hydraulic circuit including said second cavity, said first pilot port being connected to said first cavity, and said second pilot port being connected to said fourth cavity such that pressure in said sixth hydraulic circuit urges said piston towards said spool.

11. An automatic transmission in accordance with claim 2 further comprising a shift valve and a neutral valve, said neutral valve being in said third hydraulic circuit, and said neutral valve being selectively positioned to pass fluid from said clutch operating hydraulic pump to one of said automatic change-over valve and a lubrication portion of said auxiliary speed change gear in accordance with the position of said shift valve.

12. An automatic transmission in accordance with claim 2 wherein said automatic speed changing valve comprises a valve body having first, second, third and fourth cavities therein, a spool positioned in said valve body and extending from its first end in said first cavity through said second cavity to its second end in said third cavity, a piston positioned in said fourth cavity and having a axial portion extending into said third cavity for selective engagement with the second end of said spool, and a spring positioned to bias said spool toward said first cavity, said fourth hydraulic circuit including said second cavity, said first pilot port being connected to said first cavity, and said second pilot port being connected to said fourth cavity such that pressure in said sixth hydraulic circuit urges said piston towards said spool.

13. A hydraulically driven vehicle comprising:
an upper swivel body and a lower travel body having a swivel joint therebetween;
an automatic transmission positioned on said lower travel body, said automatic transmission comprising: an auxiliary speed change gear which is a power transmitting/speed change gear, said auxiliary speed change gear having an input shaft and an output shaft, a hydraulically operated high speed clutch engagable between said input shaft and said output shaft to attain a high speed range, a hydraulically operated low speed clutch engagable between said input shaft and said output shaft to attain a low speed range, said auxiliary speed change gear being capable of shifting between said high and low speed ranges; a hydraulically driven motor for driving said input shaft; a clutch operating hydraulic pump having a discharge side, an automatic change-over valve, a first hydraulic circuit which connects said high speed clutch to said automatic change-over valve, a second hydraulic circuit which connects said low speed clutch to said automatic change-over valve, a third hydraulic circuit which connects said automatic change-over valve to the discharge side of said clutch operating hydraulic pump, said automatic change-over valve selectively connecting said third hydraulic circuit to one of said first and second hydraulic circuits; a fourth hydraulic circuit which connects a pilot port of said automatic change-over valve to said discharge side of said clutch operating hydraulic pump, an automatic speed changing valve provided in said fourth hydraulic circuit between said discharge side of said clutch operating hydraulic pump and said pilot port of said automatic change-over valve, said automatic speed changing valve having first and second pilot ports such that the pressures therein are in opposition to each other; a rotation sensing hydraulic source coupled to one of said input shaft and said output shaft, said rotation sensing hydraulic source having a discharge side; a fifth hydraulic circuit which connects the discharge side of said rotation sensing hydraulic source to the first pilot port of said automatic speed changing valve; and a sixth hydraulic circuit which connects the second pilot port of said automatic speed changing valve to said second hydraulic circuit;
an engine and a main hydraulic pump located on said upper swivel body, said main hydraulic pump being driven by said engine;
a seventh hydraulic circuit connecting said hydraulically driven motor to the output of said main hydraulic pump, a second hydraulically driven motor positioned on said lower travel body to drive said clutch operating hydraulic pump; and
an eighth hydraulic circuit connecting said second hydraulically driven motor to the output of said main hydraulic pump.

14. A hydraulically driven vehicle in accordance with claim 13 further comprising a shift valve positioned on said upper swivel body, and a neutral valve positioned in said third hydraulic circuit, said neutral valve being selectively positioned to pass fluid from said clutch operating hydraulic pump to one of said automatic change-over valve and a lubrication portion of said auxiliary speed change gear in accordance with the position of said shift valve.

15. A hydraulically driven vehicle in accordance with claim 13 wherein said automatic speed changing valve has a third pilot port wherein the pressure is in opposition to the pressure in said first pilot port; wherein said rotation sensing hydraulic source comprises a rotation sensing hydraulic pump; and wherein said automatic transmission further comprises an orifice, and a ninth hydraulic circuit which connects the discharge side of said rotation sensing hydraulic pump through said orifice to the third pilot port of said automatic speed changing valve.

16. A hydraulically driven vehicle in accordance with claim 15 further comprising a shift valve positioned on said upper swivel body, a neutral valve positioned in said third hydraulic circuit, said neutral valve being selectively positioned to pass fluid from said clutch operating hydraulic pump to one of said automatic change-over valve and a lubrication portion of said auxiliary speed change gear in accordance with the position of said shift valve.

17. A hydraulically driven vehicle in accordance with claim 13 wherein said rotation sensing hydraulic source comprises an annular centrifugal hydraulic pressure detecting chamber having a pressure detecting pipe positioned therein.

18. A hydraulically driven vehicle in accordance with claim 17 further comprising a shift valve positioned on said upper swivel body, a neutral valve positioned in said third hydraulic circuit, said neutral valve being selectively positioned to pass fluid from said clutch operating hydraulic pump to one of said automatic change-over valve and a lubrication portion of said auxiliary speed change gear in accordance with the position of said shift valve.

* * * * *